US010934935B2

(12) United States Patent
Dalal et al.

(10) Patent No.: US 10,934,935 B2
(45) Date of Patent: Mar. 2, 2021

(54) ENGINE CORE ASSISTANCE

(71) Applicant: GE Aviation Systems LLC, Grand Rapids, MI (US)

(72) Inventors: Manish Ashvinkumar Dalal, Dayton, OH (US); Paul Robert Gemin, Cincinnati, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 721 days.

(21) Appl. No.: 15/419,040

(22) Filed: Jan. 30, 2017

(65) Prior Publication Data
US 2018/0216526 A1 Aug. 2, 2018

(51) Int. Cl.
*F02C 7/32* (2006.01)
*F02C 6/14* (2006.01)
(Continued)

(52) U.S. Cl.
CPC .............. *F02C 6/14* (2013.01); *F01D 15/10* (2013.01); *F02C 6/00* (2013.01); *F02C 6/20* (2013.01);
(Continued)

(58) Field of Classification Search
CPC .................... F02C 7/32; F01D 15/10
See application file for complete search history.

(56) References Cited

U.S. PATENT DOCUMENTS 4,692,671 A * 9/1987 Dishner ............... F02C 7/32
290/4 C
4,695,776 A * 9/1987 Dishner ............... F02C 7/32
290/4 C
(Continued)

FOREIGN PATENT DOCUMENTS

WO WO-8703928 A1 * 7/1987 ............... F02C 7/32
WO WO-02053403 A2 * 7/2002 ............... B60K 6/36

OTHER PUBLICATIONS

W.U.Nuwantha Fernando,, Mike Barnes, Ognjen Marjanovic, Direct Drive Permanent Magnet Generator Fed AC-DC Active Rectification and Control for MEA Engines, Apr. 26, 2010, IET Electr. Power Appl., Special Issue on Electrical Machines & Drives in the MEA, pp. 1-5. (Year: 2010).*
(Continued)

*Primary Examiner* — Gerald L Sung
*Assistant Examiner* — Marc J Amar
(74) *Attorney, Agent, or Firm* — Dority & Manning, P.A.

(57) ABSTRACT

One example aspect of the present disclosure is directed to a method for operating a gas turbine engine. One example aspect of the present disclosure is directed to a method for operating a gas turbine engine, the gas turbine engine including at least a high pressure spool and a low pressure spool. The method includes causing, by one or more control devices, electrical power to be drawn from the high pressure spool and the low pressure spool into a power distribution system. The method includes determining, by the one or more control devices, a power adjustment event associated with the high pressure spool. The method includes initiating, by the one or more control devices, a power assist operation to redirect electrical power to the high pressure spool based at least in part on the power adjustment event.

20 Claims, 6 Drawing Sheets

(51) Int. Cl.
  *F02C 6/20*    (2006.01)
  *F02C 7/36*    (2006.01)
  *F02C 6/00*    (2006.01)
  *F02C 9/16*    (2006.01)
  *F01D 15/10*   (2006.01)
  *H02P 101/30*  (2015.01)

(52) U.S. Cl.
  CPC ............... *F02C 7/32* (2013.01); *F02C 7/36* (2013.01); *F02C 9/16* (2013.01); *F05D 2220/323* (2013.01); *F05D 2220/50* (2013.01); *F05D 2220/76* (2013.01); *F05D 2270/05* (2013.01); *H02P 2101/30* (2015.01)

(56) References Cited

U.S. PATENT DOCUMENTS

| | | | | |
|---|---|---|---|---|
| 4,967,097 | A * | 10/1990 | Mehl | H02P 9/307 290/4 C |
| 5,153,498 | A * | 10/1992 | Parro | H02P 9/42 322/25 |
| 5,466,974 | A * | 11/1995 | Sutrina | H02B 1/04 307/38 |
| 6,023,134 | A * | 2/2000 | Carl | F02C 7/32 290/30 A |
| 6,418,707 | B1 * | 7/2002 | Paul | F01D 15/10 60/39.15 |
| 6,992,403 | B1 * | 1/2006 | Raad | F02C 7/275 290/10 |
| 7,116,003 | B2 * | 10/2006 | Hoppe | F01D 15/10 290/1 A |
| 7,425,807 | B1 * | 9/2008 | Perkins | F01D 15/10 318/150 |
| 7,513,120 | B2 | 4/2009 | Kupratis | |
| 7,635,922 | B2 | 12/2009 | Becker | |
| 8,201,414 | B2 | 6/2012 | Haehner et al. | |
| 8,561,413 | B2 | 10/2013 | Taneja | |
| 8,738,268 | B2 * | 5/2014 | Karimi | H02J 3/38 701/99 |
| 9,233,759 | B2 * | 1/2016 | Bader | B64C 15/12 |
| 10,090,676 | B2 * | 10/2018 | Knowles | H02M 7/02 |
| 2005/0056021 | A1 * | 3/2005 | Belokon | F02C 9/28 60/772 |
| 2006/0042252 | A1 * | 3/2006 | Derouineau | F02C 9/26 60/703 |
| 2006/0061213 | A1 * | 3/2006 | Michalko | H02J 4/00 307/9.1 |
| 2006/0150633 | A1 | 7/2006 | McGinley et al. | |
| 2006/0168968 | A1 * | 8/2006 | Zielinski | F02C 7/268 60/778 |
| 2008/0174177 | A1 * | 7/2008 | Langlois | H02J 1/08 307/9.1 |
| 2008/0238202 | A1 * | 10/2008 | Kern | H02P 9/302 307/53 |
| 2009/0224599 | A1 * | 9/2009 | Yue | H02J 4/00 307/9.1 |
| 2010/0058731 | A1 * | 3/2010 | Haehner | F01D 15/08 60/39.15 |
| 2010/0164234 | A1 * | 7/2010 | Bowman | F02C 7/32 290/1 R |
| 2010/0181826 | A1 * | 7/2010 | Fuller | B60R 16/03 307/9.1 |
| 2010/0270858 | A1 * | 10/2010 | Foch | F02C 6/08 307/9.1 |
| 2011/0049891 | A1 * | 3/2011 | Bedrine | F01D 15/10 290/46 |
| 2012/0017602 | A1 | 1/2012 | Hansen et al. | |
| 2012/0221157 | A1 * | 8/2012 | Finney | F02C 7/32 700/287 |
| 2013/0076120 | A1 * | 3/2013 | Wagner | B64D 33/00 307/9.1 |
| 2013/0147192 | A1 | 6/2013 | Condon et al. | |
| 2014/0032002 | A1 * | 1/2014 | Iwashima | B64D 41/007 700/295 |
| 2014/0197681 | A1 * | 7/2014 | Iwashima | H02J 3/32 307/9.1 |
| 2014/0216047 | A1 * | 8/2014 | Morisaki | F02C 7/268 60/774 |
| 2014/0225378 | A1 * | 8/2014 | Anastasio | F02C 9/42 |
| 2014/0265327 | A1 * | 9/2014 | Teichmann | H02P 9/08 290/31 |
| 2014/0360205 | A1 * | 12/2014 | French | F01D 15/10 60/786 |
| 2015/0100180 | A1 * | 4/2015 | Oyori | F01D 15/10 701/3 |
| 2015/0130186 | A1 * | 5/2015 | Vieillard | B64D 27/24 290/31 |
| 2016/0280394 | A1 * | 9/2016 | Radun | H02J 1/10 |
| 2016/0356171 | A1 * | 12/2016 | Thet | F01D 15/10 |
| 2017/0037774 | A1 * | 2/2017 | Jones | F02B 63/04 |
| 2017/0145925 | A1 * | 5/2017 | Kusumi | H02J 3/386 |
| 2017/0184032 | A1 * | 6/2017 | Poumarede | F02C 9/42 |
| 2017/0226933 | A1 * | 8/2017 | Klonowski | F01D 15/10 |
| 2017/0328282 | A1 * | 11/2017 | Jensen | F02C 7/32 |
| 2017/0335795 | A1 * | 11/2017 | Klemen | F02K 3/06 |
| 2018/0187604 | A1 * | 7/2018 | Poumarede | B64D 35/08 |
| 2018/0291807 | A1 * | 10/2018 | Dalal | F02C 6/20 |
| 2019/0061963 | A1 * | 2/2019 | Sankrithi | B64D 27/24 |
| 2020/0148372 | A1 * | 5/2020 | Long | F02K 3/04 |

OTHER PUBLICATIONS

K. Muehlbauer, D. Gerling, Two-Generator-Concepts for Electric Power Generation in More Electric Aircraft Engine, XIX International Conference on Electrical Machines—ICEM 2010, Rome, 2010, pp. 1-2. (Year: 2010).*
U.S. Appl. No. 14/826,482, filed Aug. 14, 2015.
Chinese Office Action Corresponding to Application No. 201810089148 dated Nov. 1, 2019.

* cited by examiner

ENGINE CORE ASSISTANCE

FIELD

The present subject matter relates generally to aerial vehicles.

BACKGROUND

An aerial vehicle can include one or more engines. The one or more engines can include a high pressure spool and a low pressure spool. Power can be drawn from the high pressure spool and the low pressure spool and provided throughout the aerial vehicle via a power distribution and conversion system. With the power distribution and conversion system of aerial vehicles increasingly needing more power, more power is being drawn from the one or more engines. Certain incidents, such as thrust, bleed air, and electrical load changes, can require more power to be retained by the one or more engines.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for operating a gas turbine engine, the gas turbine engine including at least a high pressure spool and a low pressure spool. The method includes causing, by one or more control devices, electrical power to be drawn from the high pressure spool and the low pressure spool into a power distribution system. The method includes determining, by the one or more control devices, a power adjustment event associated with the high pressure spool. The method includes initiating, by the one or more control devices, a power assist operation to redirect electrical power to the high pressure spool (or reduce the load on the high pressure spool) based at least in part on the power adjustment event. Power could be redirected to any of the at least two spools to assist the engine operation.

Another example aspect of the present disclosure is directed to a system for operating a gas turbine engine. The system includes a gas turbine engine including at least a high pressure spool and a low pressure spool. The system includes one or more memory devices. The system includes one or more control devices. The one or more control devices are configured to cause electrical power to be drawn from the high pressure spool and the low pressure spool into a power distribution system. The one or more control devices are configured to determine a power adjustment event associated with the high pressure spool. The one or more control devices are configured to initiate a power assist operation to redirect electrical power or reduce the load on the high pressure spool, or any of the at least two engine pressure spools, based at least in part on the power adjustment event.

Other example aspects of the present disclosure are directed to systems, methods, aerial vehicles, avionics systems, devices, non-transitory computer-readable media for operating a gas turbine engine. Variations and modifications can be made to these example aspects of the present disclosure.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
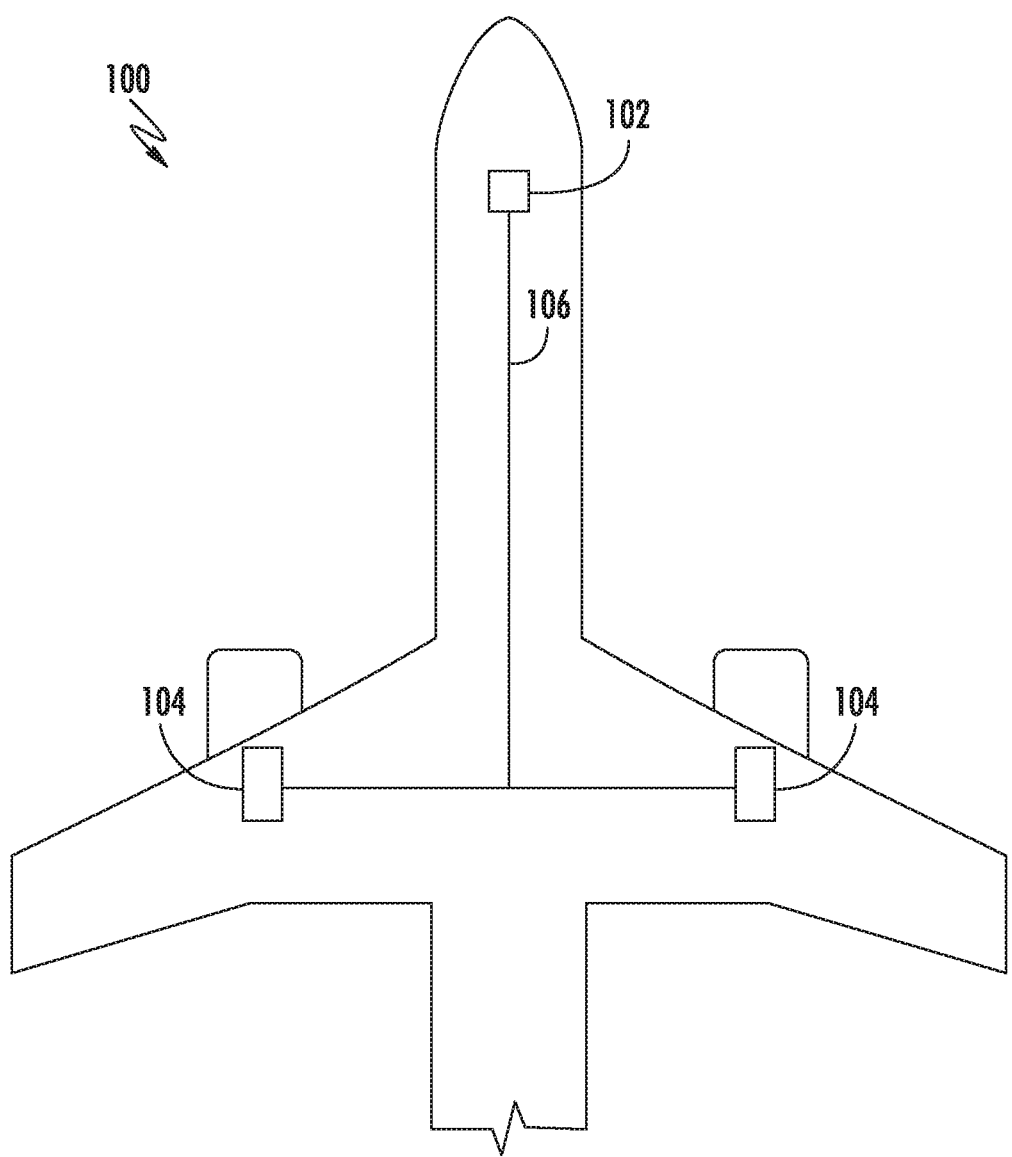
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can operate a gas turbine engine. A gas turbine engine can be, for instance, an aeronautical gas turbine engine. An aerial vehicle can include one or more engines. Each of the one or more engines can include a high pressure spool and a low pressure spool. The aerial vehicle can include a power distribution and conversion system. The power distribution and conversion system of the aerial vehicle can draw electrical power from the high pressure spool and the low pressure spool.

Electrical load requirements are increasing for aerial vehicles. As electrical load requirements increase, more electrical power is needed to be drawn from the one or more engines of the aerial vehicles. However, certain incidents, such as thrust, bleed air, and electrical load changes, can benefit from reduced mechanical load on the one or more engines. Such incidents can be called power adjustment events. When a power adjustment event occurs, a power assist operation can be initiated.

The power assist operation can cause power to cease from being drawn from the high pressure spool in response to, for instance, a power adjustment event. A power adjustment event can be an event in which it can be beneficial to retain power in one or more of the one or more engines. Example power adjustment events can include thrust, bleed air, electrical load changes, etc. The power assist operation can cause the high pressure spool to intake, instead of output, power. The power assist operation can cause some or all of the power drawn from the low pressure spool to be redirected from the power distribution and conversion system and to the high pressure spool. When additional power is no longer needed for the power adjustment event (because, for example, the power adjustment event ends in brief time lasting for few hundred milliseconds to few seconds only), the power assist operation can terminate and the power distribution and conversion system can resume drawing power from the high pressure spool and the low pressure spool as in normal operation.

The systems and methods for operating a gas turbine engine disclosed herein can include three modes: start mode, normal operation, and power assist operation. During start mode, a high pressure spool generator system can provide power to a high pressure spool of an engine to start the engine. Once the engine starts (lights off) then, the high pressure spool generator system can operate in normal operation. Start mode can last 60-90 seconds for a successful start. The systems and methods disclosed herein can seamlessly transition from normal operation to power assist operation and then back to normal operation using no break power transfer. No break power transfer can mean power to essential loads (plus some non-essential loads as architecture allows) do not experience any power interruption during the transition from normal operation to power assist operation. Before the transition, essential loads (plus some non-essential loads as architecture allows) on the high pressure spool can be disconnected from the high pressure spool generator system and powered by one or more of a low pressure spool generator system, a battery or an auxiliary power unit (APU). Depending on aircraft load analysis and power system architecture definition, both the high pressure spool and the low pressure spool generator systems can be loaded at 50% to 60% during normal flight operation to carry spare capacity for failure modes of other engine/generators and peak overload condition. During power assist operation, the low pressure spool generator system can have enough capacity (in overload condition, e.g., 150% for 5 minute or 200% for 5 seconds) to carry all its own bus loads, bus loads (all essential plus all or some non-essential loads) of the high pressure spool, and also provide power for the power assist operation. Power can be managed to remain within high pressure spool and low pressure spool horsepower extraction ratings.

The low pressure spool generator system can operate at 100% load or even higher up to 150% load during power assist operation, which can be limited to few seconds. The power assist operation can make use of an overload capability. When the power assist operation is limited to a few seconds, the low pressure spool generator system can be capable of providing this power as an overload condition. Power generator systems can be rated for 150% loads (5 min operation) and 200% loads (5 sec operation). As a backup, some of the high pressure spool loads (non-essential) can be shed to prevent the low pressure spool generator system from being overloaded. Some controllable loads, such as environmental control system (ECS) loads, can be reduced during the power assist operation.

If an auxiliary power unit (APU) and/or battery and/or an electrical accumulator unit (EAU) are onboard the aerial vehicle then, unused APU generator power and available battery/EAU power can supplement the low pressure spool generator output power to provide assistance to the high pressure spool and/or feed a high pressure spool load bus. Management of electrical power from an APU generator and/or battery can allow the power assist operation to perform without compromising flight critical loads. Architectures can selectively use bidirectional converters for the power assist operation functionality and uni-directional converters for normal operation. An electrical system power split, including an amount of assistance coming from another spool or a backup generator (e.g., the APU generator) or energy storage can be commanded by an engine to optimize a number of parameters (stall margin, temperatures, transient time, etc.) as indicated by an engine state and a transient. The systems and methods described herein can apply to turboshaft and turbo fan engines. For turboshafts, it can apply to helicopter applications, marine applications, and stationary generators set applications with electric start, or other mechanical drive applications which have generators on multiple spools.

The systems and methods disclosed herein can eliminate a need for a separate motor on the high pressure spool for core assistance. Bidirectional power capability provided by the high pressure spool can help eliminate a need for the separate motor. Due to a bidirectional power transfer capability of the high pressure spool generator system, power can flow from or to the high pressure spool as needed and commanded. The systems and methods disclosed herein can eliminate a need for a separate air turbine starter as a high pressure spool system can be designed to provide generate (normal operation), start (engine start), and motoring (power assist operation) capabilities. The systems and methods disclosed herein can eliminate a need for a high power battery rated to provide power for the power assist operation. The power assist operation can be used with an available battery and/or a backup generator (e.g. APU generator). The systems and methods disclosed herein can eliminate a need for an oversized emergency battery to provide power for the power assist operation. The power assist operation can be used with an available battery and/or a backup generator (e.g. APU generator). The systems and methods disclosed herein can eliminate a need for an oversized low pressure spool generator system to provide power for the power assist operation. The overload capability of the low pressure spool generator system can be leveraged to provide power for the power assist operation. The systems and methods disclosed herein can eliminate a need to shed high pressure spool loads during the power assist operation as the low pressure spool generator system can feed power to the high pressure spool loads during the power assist operation. The power assist operation can be used in conjunction with a power management strategy. Overall, the systems and methods disclosed herein can enable full flight performance while providing the power assist operation.

In this way, the systems and methods according to example aspects of the present disclosure can have a number of technical effects and benefits. For instance, example aspects of the present disclosure can have a technical effect of enabling power extraction in the range from few tens of kilowatts to megawatts while managing engine component stall margins.

In some embodiments, the systems and methods of the present disclosure also provide an improvement to an electrical power system in an aircraft. For instance, the methods and systems operate a gas turbine engine. The gas turbine engine including at least a high pressure spool and a low pressure spool. For example, the systems and methods can cause electrical power to be drawn from the high pressure spool and the low pressure spool into a power distribution system, determine a power adjustment event associated with the high pressure spool, and initiate a power assist operation to redirect electrical power to the high pressure spool based at least in part on the power adjustment event. This can improve transient performance of the engine against thrust, bleed air, and electrical load changes. Additionally, this can put power on the high pressure spool, reducing and/or overcoming accessory loads, to decrease pressure across the high pressure spool (improving stall margin) and allowing an increase in speed so the high pressure spool pulls in more air. Pulling in more air allows more fuel flow, resulting in faster response from a core (high spool) of the engine. Additionally, improved transient performance of the engine enables increased mission capability of the aerial vehicle.

FIG. 1 depicts an example aerial vehicle 100 in accordance with example embodiments of the present disclosure. The aerial vehicle 100 can include one or more control systems 102 (described in more detail in FIG. 6 below), one or more power systems 104 (described in more detail in FIG. 2 and FIG. 3 below), and a communication bus 106 to facilitate communication between the one or more control systems 102 and the one or more power systems 104. The one or more power systems 104 can include an engine. An engine can include a high pressure spool, an intermediate pressure spool, and a low pressure spool. The high pressure spool can be associated with a gear box. The intermediate pressure spool can be associated with a gear box. The low pressure spool can be associated with a gear box. Each gear box can be associated with a generator. Each generator can be associated with a power converter. Each power converter can be in communication with a main line contactor. Each main line contactor can connect a power distribution and conversion system to each of the power converters. The main line contactors can be in communication with each other via a core assist contactor and a bus tie contactor.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
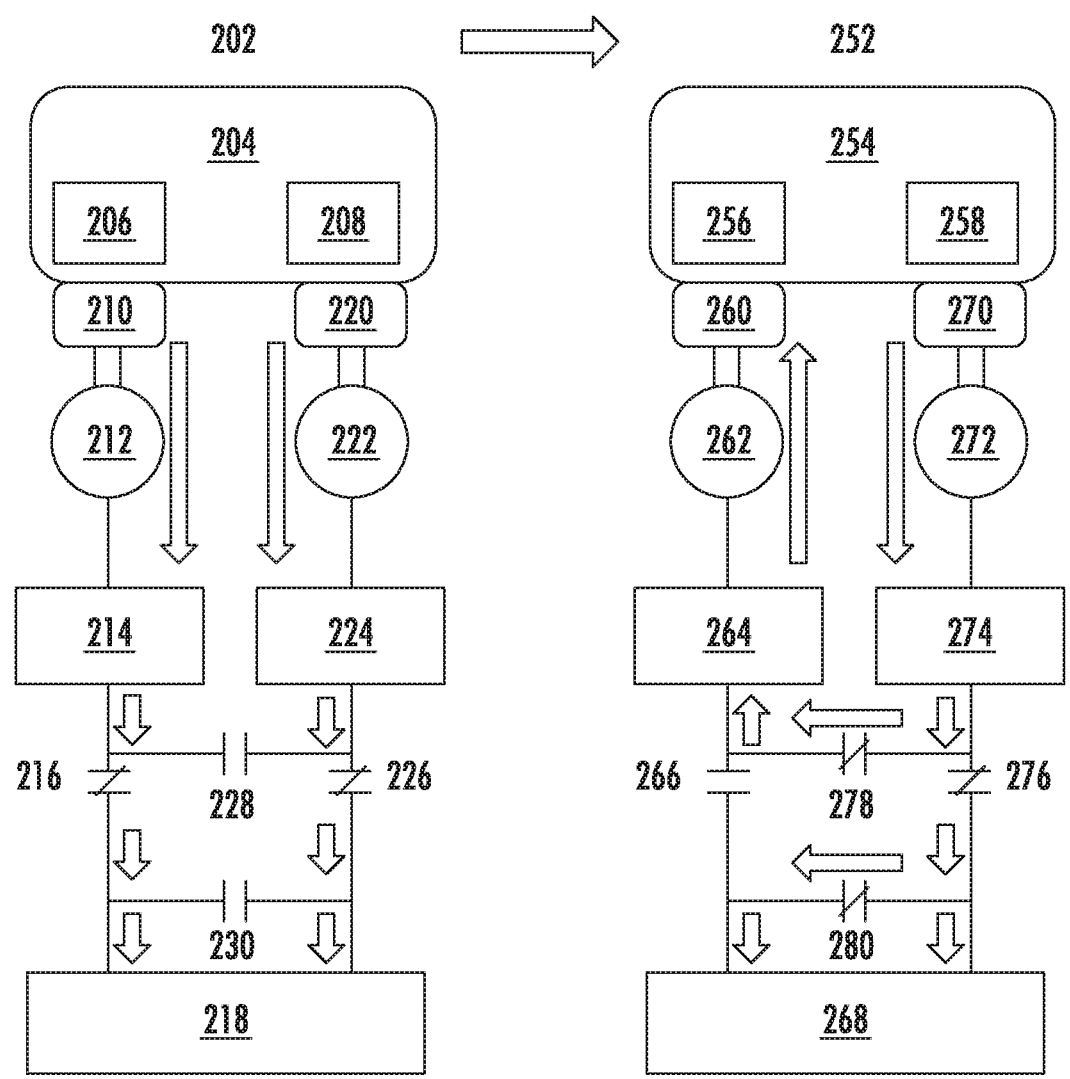
FIG. 2 depicts block diagrams of an example power system transitioning from normal operation to power assist operation according to example embodiments of the present disclosure.

FIG. 2 depicts block diagrams of an example power system transitioning from normal operation to power assist operation (or core assist operation) according to example embodiments of the present disclosure. Block diagram 202 can depict the power system during normal operation. The power system can include an engine 204. The engine 204 can include a high pressure spool 206 and a low pressure spool 208. The high pressure spool 206 can be in communication with a first gear box 210. The low pressure spool 208 can be in communication with a second gear box 220. The first gear box 210 can be in communication with a first generator 212. The first generator 212 can receive rotational energy from the first gear box 210. The second gear box 220 can be in communication with a second generator 222. The second generator 222 can receive rotational energy from the second gear box 220. The first generator 212 and/or the second generator 222 can include a wound field synchronous machine, a permanent magnet machine, an induction machine, a switch reluctance machine, the like, and/or any combination of the foregoing.

The first generator 212 can be in communication with a first power converter 214. The second generator 222 can be in communication with a second power converter 224. The first power converter 214 can receive power from the first generator 212. The second power converter 224 can receive power from the second generator 222. The first power converter 214 and/or the second power converter 224 can be bidirectional, active, AC-DC, AC-AC, the like, and/or any combination of the foregoing.

The first power converter 214 can be in communication with a first main line contactor 216. The second power converter 224 can be in communication with a second main line contactor 226. During normal operation, the first main line contactor 216 and the second main line contactor 226 are closed, creating a path from the first power converter 214 and the second power converter 224 to a power distribution and conversion system 218. The power distribution and conversion system 218 can receive power from the first power converter 214 and/or the second power converter 224. The power converter 214 and/or the second power converter 224 can include DC output (e.g., ≥270 Vdc, ≥±270 Vdc, etc.) and/or AC output (e.g., 115 Vac, 230 Vac, >230 Vac, etc.). A core assist contactor 228 and a bus tie contactor 230 can be located as shown in FIG. 1 to allow bypassing main line contactor 216 as needed. During normal operation, the core assist contactor 228 and a bus tie contactor 230 are opened, preventing any cross power flow e.g. first power converter 214 feeding power through second main line contactor 226 or second power converter 224 feeding power through first main line contactor 216.

Block diagram 252 can depict the power system during power assist operation (or core assist operation). The power system can include an engine 254. The engine 254 can include a high pressure spool 256 and a low pressure spool 258. The high pressure spool 256 can be in communication with a first gear box 260. The low pressure spool 258 can be in communication with a second gear box 270. The first gear box 260 can be in communication with a first generator 262. The first generator 262 can transfer power to the first gear box 260. The second gear box 270 can be in communication with a second generator 272. The second generator 272 can receive rotational energy from the first gear box 270. The first generator 262 and/or the second generator 272 can include a wound field synchronous machine, a permanent magnet machine, an induction machine, a switch reluctance machine, the like, and/or any combination of the foregoing.

The first generator 262 can be in communication with a first power converter 264. The second generator 272 can be in communication with a second power converter 274. The first power converter 264 can transfer power to the first generator 262. The second power converter 274 can receive power from the second generator 272. The first power converter 264 and/or the second power converter 274 can be bidirectional, active, AC-DC, AC-AC, the like, and/or any combination of the foregoing.

The first power converter 264 can be in communication with a first main line contactor 266. The second power converter 274 can be in communication with a second main line contactor 276. The first power converter 264 and/or the second power converter 274 can include DC output (e.g., ≥270 Vdc, ≥±270 Vdc, etc.) and/or AC output (e.g., 115 Vac, 230 Vac, >230 Vac, etc.). A core assist contactor 278 and a bus tie contactor 280 can be located as shown in FIG. 2 to allow bypassing main line contactor 266 as needed. During power assist operation, the first main line contactor 266 is opened, and the second main line contactor 276, the core assist contactor 278, and a bus tie contactor 280 are closed. The power distribution and conversion system 268 can receive power from the second power converter 274 via the second main line contactor 276 and the bus tie contactor 280. The part of power distribution and conversion system 280 which is normally fed power from first power converter 264 will instead get all power from second power converter 274. The second power converter 274 can provide power to the first power converter 264 via the core assist contactor 278 to enable engine core assist operation. Although the illustrated power assist operation assists the high pressure spool, any spool of an engine can be assisted with the methods and systems described herein.

Figure 3:
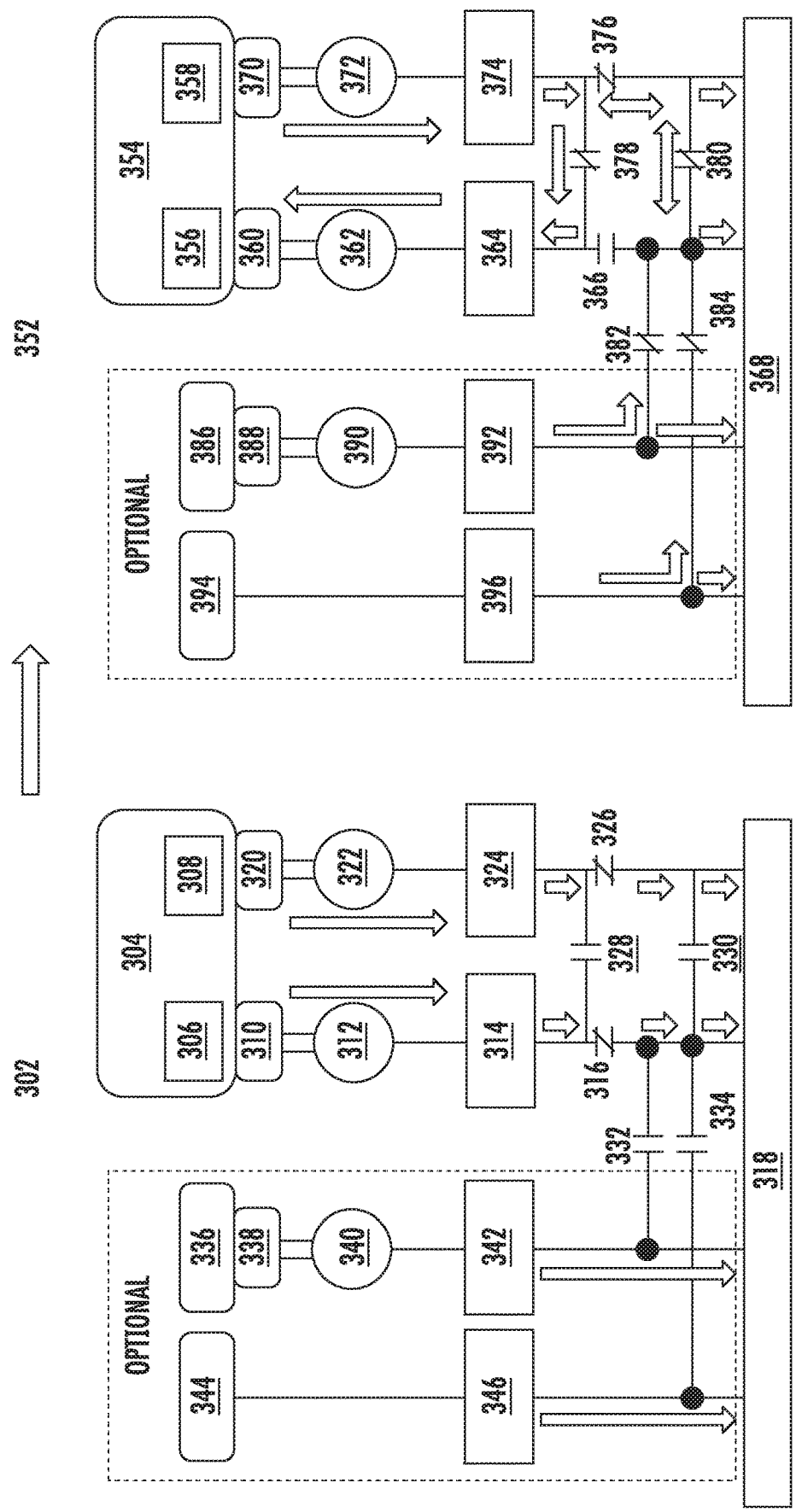
FIG. 3 depicts block diagrams of an example power system transitioning from normal operation to power assist operation according to example embodiments of the present disclosure.

FIG. 3 depicts block diagrams of an example power system transitioning from normal operation to power assist operation (or core assist operation) according to example embodiments of the present disclosure. Block diagram 302 can depict the power system during normal operation. The power system can include an engine 304. The engine 304 can include a high pressure spool 306 and a low pressure spool 308. The high pressure spool 306 can be in communication with a first gear box 310. The low pressure spool 308 can be in communication with a second gear box 320. The first gear box 310 can be in communication with a first generator 312. The first generator 312 can receive rotational energy from the first gear box 310. The second gear box 320 can be in communication with a second generator 322. The second generator 322 can receive rotational energy from the second gear box 320. The first generator 312 and/or the second generator 322 can include a wound field synchronous machine, a permanent magnet machine, an induction machine, a switch reluctance machine, the like, and/or any combination of the foregoing.

The first generator 312 can be in communication with a first power converter 314. The second generator 322 can be in communication with a second power converter 324. The first power converter 314 can receive power from the first generator 312. The second power converter 324 can receive power from the second generator 322. The first power converter 314 and/or the second power converter 324 can be bidirectional, active, AC-DC, AC-AC, the like, and/or any combination of the foregoing.

The first power converter 314 can be in communication with a first main line contactor 316. The second power converter 324 can be in communication with a second main line contactor 326. During normal operation, the first main line contactor 316 and the second main line contactor 326 are closed, creating a path from the first power converter 314 and the second power converter 324 to a power distribution and conversion system 318. The power distribution and conversion system 318 can receive power from the first power converter 314 and/or the second power converter 324. The power converter 314 and/or the second power converter 324 can include DC output (e.g., ≥270 Vdc, ≥±270 Vdc, etc.) and/or AC output (e.g., 115 Vac, 230 Vac, >230 Vac, etc.). A core assist contactor 328 and a bus tie contactor 330 can be located as shown in FIG. 3 to allow bypassing main line contactor 316 as needed. During normal operation, the core assist contactor 328 and a bus tie contactor 330 are opened, preventing any cross power flow e.g. first power converter 314 feeding power through second main line contactor 326 or second power converter 324 feeding power through first main line contactor 316.

Optionally, an auxiliary power unit (APU) 336 can be in communication with an APU gear box 338. The APU gear box 338 can be in communication with an APU generator 340. The APU generator 340 can receive power from the APU gear box 338. The APU generator 340 can include a wound field synchronous machine, a permanent magnet machine, an induction machine, a switch reluctance machine, the like, and/or any combination of the foregoing. The APU generator 340 can be in communication with an APU power converter 342. The APU power converter 342 can receive power from the APU generator 340. The APU power converter 342 can be bidirectional, active, AC-DC, AC-AC, the like, and/or any combination of the foregoing. The APU power converter 342 can be in communication with the power distribution and conversion system 318. The power distribution and conversion system 318 can receive power from the APU power converter 342. The APU power converter 342 can be in communication with the first main line contactor 316 via a second bus tie contactor 332. During normal operation, the second bus tie contactor 332 can be open, preventing the APU power converter 342 to cross feed any power through bus tie contactor 332 to the power distribution and conversion system 318. The APU power converter 342 can include DC output (e.g., ≥270 Vdc, ≥±270 Vdc, etc.) and/or AC output (e.g., 115 Vac, 230 Vac, >230 Vac, etc.).

Optionally, a battery or any energy storage device such as capacitor 344 can be in communication with a battery charger 346. The battery charger 346 can be in communication with the power distribution and conversion system 318. The power distribution and conversion system 318 can receive power from the battery charger 346. The battery charger 346 can be in communication with the first main line contactor 316 via a third bus tie contactor 334. During normal operation, the third bus tie contactor 334 can be open, preventing the battery charger 346 to feed any power to main line contactor 316 through a bus tie contactor 334.

Block diagram 352 can depict the power system during power assist operation (or core assist operation). The power system can include an engine 354. The engine 354 can include a high pressure spool 356 and a low pressure spool 358. The high pressure spool 356 can be in communication with a first gear box 360. The low pressure spool 358 can be in communication with a second gear box 370. The first gear box 360 can be in communication with a first generator 362. The first generator 362 can transfer power to the first gear box 360. The second gear box 370 can be in communication with a second generator 372. The second generator 372 can receive rotational energy from the second gear box 370. The first generator 362 and/or the second generator 372 can include a wound field synchronous machine, a permanent magnet machine, an induction machine, a switch reluctance machine, the like, and/or any combination of the foregoing.

The first generator 362 can be in communication with a first power converter 364. The second generator 372 can be in communication with a second power converter 374. The first power converter 364 can transfer power to the first generator 362. The second power converter 374 can receive power from the second generator 372. The first power converter 364 and/or the second power converter 374 can be bidirectional, active, AC-DC, AC-AC, the like, and/or any combination of the foregoing.

The first power converter 364 can be in communication with a first main line contactor 366. The second power converter 374 can be in communication with a second main line contactor 376. The power converter 364 and/or the second power converter 374 can include DC output (e.g., ≥270 Vdc, ≥±270 Vdc, etc.) and/or AC output (e.g., 115 Vac, 230 Vac, >230 Vac, etc.). A core assist contactor 378 and a bus tie contactor 380 can be located as shown in FIG. 3 to allow bypassing first main line contactor 366 as needed. During power assist operation, the first main line contactor 366 is opened, and the second main line contactor 376, the core assist contactor 378, and a bus tie contactor 380 are closed. The power distribution and conversion system 368 can receive power from the second power converter 374 via the second main line contactor 376 and the bus tie contactor 380. The part of power distribution and conversion system 368 which is normally fed power from first power converter 364 will instead get all power from second power converter 374. The second power converter 374 can provide power to the first power converter 364 via the core assist contactor 378.

Optionally, an auxiliary power unit (APU) 386 can be in communication with an APU gear box 388. The APU gear box 388 can be in communication with an APU generator 390. The APU generator 390 can receive power from the APU gear box 388. The APU generator 390 can include a wound field synchronous machine, a permanent magnet machine, an induction machine, a switch reluctance machine, the like, and/or any combination of the foregoing. The APU generator 390 can be in communication with an APU power converter 392. The APU power converter 392 can receive power from the APU generator 390. The APU power converter 392 can be bidirectional, active, AC-DC, AC-AC, the like, and/or any combination of the foregoing. The APU power converter 392 can be in communication with the power distribution and conversion system 368. The power distribution and conversion system 368 can receive power from the APU power converter 392. The APU power converter 392 can be in communication with the first main line contactor 366 via a second bus tie contactor 382. During power assist operation, the second bus tie contactor 382 can be closed, allowing the APU power converter 392 to cross feed power to the power distribution and conversion system 368 through the second bus tie contactor 382. The APU power converter 392 can include DC output (e.g., ≥270 Vdc, ≥±270 Vdc, etc.) and/or AC output (e.g., 115 Vac, 230 Vac, >230 Vac, etc.).

Optionally, a battery 394 can be in communication with a battery charger 396. The battery charger 396 can be in communication with the power distribution and conversion system 368. The power distribution and conversion system 368 can receive power from the battery charger 396. The battery charger 396 can be in communication with the first main line contactor 366 via a third bus tie contactor 384. During power assist operation, the third bus tie contactor 384 can be closed, allowing the battery charger 396 to cross feed power to the power distribution and conversion system 368 through the third bus tie contactor 384. Although the illustrated power assist operation assists the high pressure spool, any spool of an engine can be assisted with the methods and systems described herein.

Figure 4:
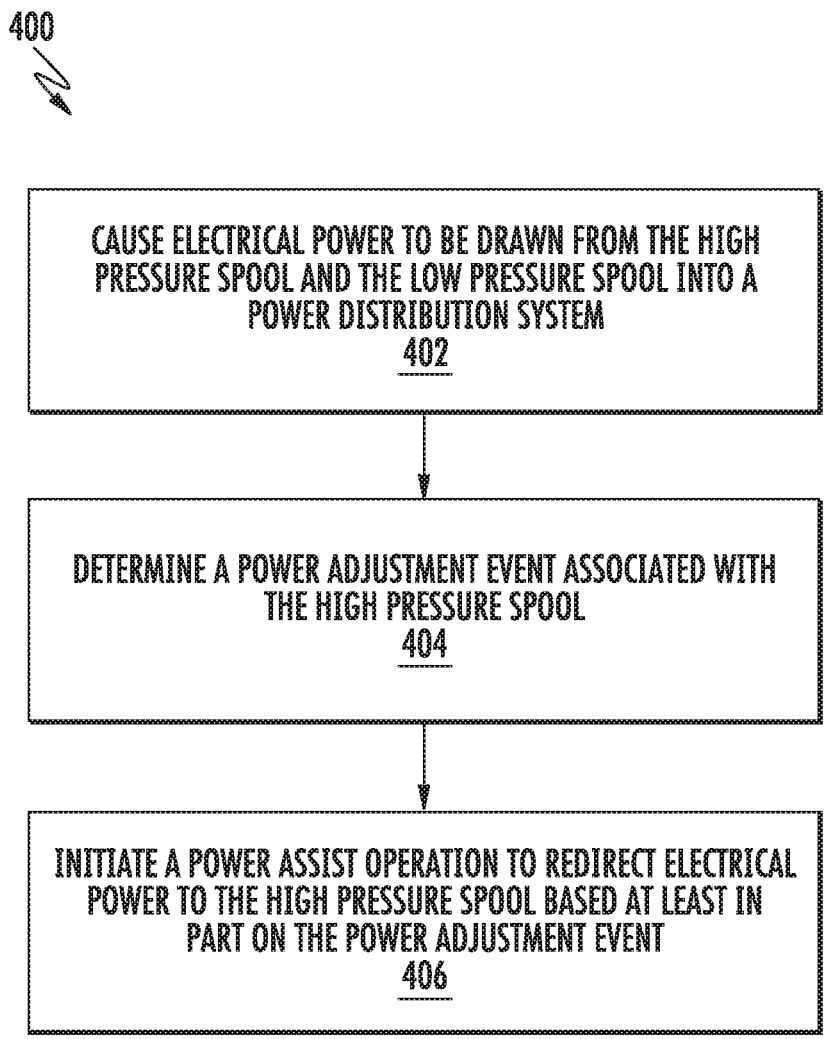
FIG. 4 depicts a flow diagram of an example method according to example embodiments of the present disclosure.

FIG. 4 depicts a flow diagram of an example method 400 for operating a gas turbine engine. The gas turbine engine can include at least a high pressure spool and a low pressure spool. Optionally, the gas turbine engine can also include an intermediate pressure spool. Although the illustrated power assist operation assists the high pressure spool, any spool of an engine can be assisted with the methods and systems described herein. The method of FIG. 4 can be implemented using, for instance, the control system 600 of FIG. 6. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), electrical power can be caused to be drawn from the high pressure spool and the low pressure spool into a power distribution system. For instance, the control system 600 can cause electrical power to be drawn from the high pressure spool and the low pressure spool into a power distribution system. For example, causing can include, for instance, sending a control signal to one or more devices to cause an operation. An operation can include, for instance, opening and/or closing a contactor. At (404), a power adjustment event associated with the high pressure spool can be determined. For instance, the control system 600 can determine a power adjustment event associated with the high pressure spool. The determination of a power adjustment event can include a detection of thrust, bleed air, electrical load changes, and/or the like.

At (406), a power assist operation (or core assist operation) can be initiated to redirect electrical power to the high pressure spool based at least in part on the power adjustment event. For instance, the control system 600 can initiate a power assist operation (or core assist operation) to redirect electrical power to the high pressure spool based at least in part on the power adjustment event.

Optionally, electrical power can be caused to no longer be drawn from the high pressure spool. For instance, the control system 600 can cause electrical power to no longer be drawn from the high pressure spool. Optionally, part of the electrical power drawn from the low pressure spool can be caused to be redirected to the high pressure spool. For instance, the control system 600 can cause part of the electrical power drawn from the low pressure spool to be redirected to the high pressure spool. Optionally, the power assist operation can include using one or more of an overload capability of a generator associated with the low pressure spool, an overload capability of a generator associated with the intermediate spool, and an overload capability of a generator associated with the high pressure spool. Optionally, the power assist operation can include using an overload capability of a generator associated with at least one of the at least two spools. Optionally, part of the electrical power drawn from a battery, or any energy storage device, can be caused to be redirected to the high pressure spool. For instance, the control system 600 can cause part of the electrical power drawn from a battery, or any energy storage device, to be redirected to the high pressure spool. Optionally, the power assist operation can include using an overload capability of the battery or any energy storage device. Optionally, part of the electrical power drawn from an auxiliary power unit (APU) can be caused to be redirected to the high pressure spool. For instance, the control system 600 can cause part of the electrical power drawn from an auxiliary power unit (APU) to be redirected to the high pressure spool. Optionally, the power assist operation can include using an overload capability of the APU. Optionally, electrical power redirected to the high pressure spool can come from a generator associated with a low pressure spool, a generator associated with an APU, a battery, any other source, or any combination of the foregoing. For instance, the control system 600 can cause electrical power to be redirected to the high pressure spool from a generator associated with a low pressure spool, a generator associated with an APU, a battery, any other source, or any combination of the foregoing. Optionally, the power assist operation can include using an overload capability of a generator associated with the APU or any other source or combination of sources. In an aspect, an overload capability of the components can feed power to the high pressure spool for the power assist operation while also providing power to the power distribution system. For example, an overload capability of a generator associated with the low pressure spool can be 150% for 5 minutes and 200% for 5 seconds. When the power assist operation is between a few milliseconds to a few seconds, the overload capability of the generator can be leveraged to supply power to both the power assist operation and the power distribution system.

Optionally, the power assist operation can be terminated when the power adjustment event terminates. For instance, the control system 600 can terminate the power assist operation when the power adjustment event terminates. Optionally, electrical power drawn from the low pressure spool can be caused to no longer be redirected to the high pressure spool. For instance, the control system 600 can cause electrical power drawn from the low pressure spool to no longer be redirected to the high pressure spool. Optionally, electrical power can be caused to resume being drawn from the high pressure spool. For instance, the control system 600 can cause electrical power to resume being drawn from the high pressure spool. Optionally, electrical power drawn from the battery can be caused to no longer be redirected to the high pressure spool. For instance, the control system 600 can cause electrical power drawn from the battery to no longer be redirected to the high pressure spool. Optionally, electrical power drawn from the APU can be caused to no longer be redirected to the high pressure spool. For instance, the control system 600 can cause electrical power drawn from the APU to no longer be redirected to the high pressure spool.

Figure 5:
FIG. 5 depicts a flow diagram of an example power assist operation according to example embodiments of the present disclosure.

FIG. 5 depicts a flow diagram of an example method 500 for power assist operation. The method of FIG. 5 can be implemented using, for instance, the control system 600 of FIG. 6. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), a main line contactor can be caused to be switched from a closed position to an opened position. For instance, the control system 600 can cause a main line contactor to be switched from a closed position to an opened position. At (504), a core assist contactor can be caused to be switched from an opened position to a closed position. For instance, the control system 600 can cause a core assist contactor to be switched from an opened position to a closed position. At (506), a bus tie contactor can be caused to be switched from an opened position to a closed position. For instance, the control system 600 can cause a bus tie contactor to be switched from an opened position to a closed position.

Figure 6:
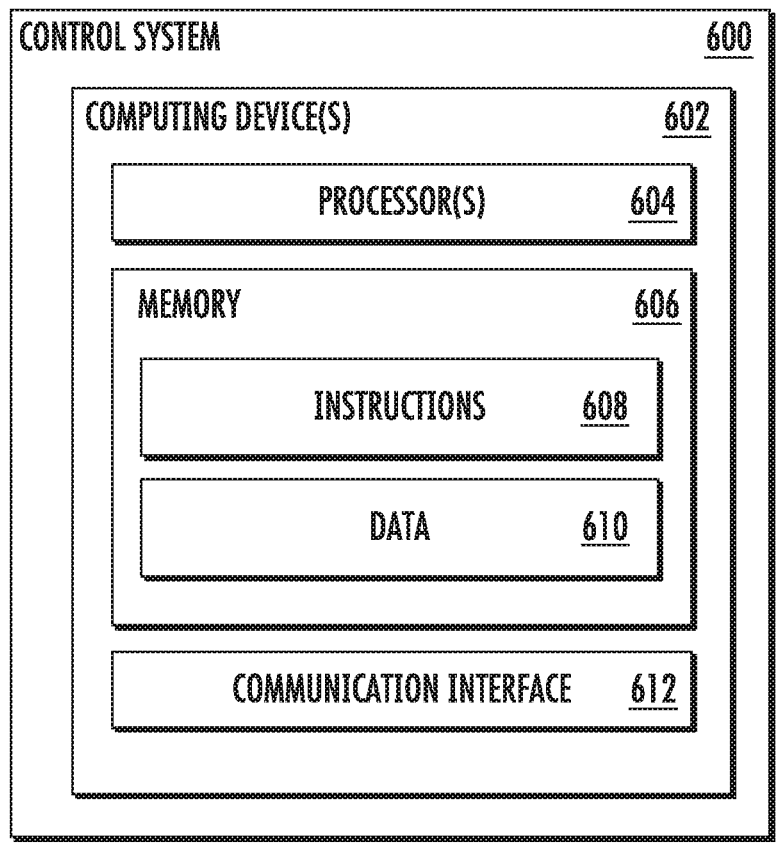
FIG. 6 depicts a control system for implementing one or more aspects according to example embodiments of the present disclosure.

FIG. 6 depicts a block diagram of an example control system 600 that can be used to implement methods and systems according to example embodiments of the present disclosure. As shown, the control system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for operating a gas turbine engine, as described with reference to FIG. 4.

The memory device(s) 606 can further store data 610 that can be accessed by the processors 604. For example, the data 610 can include any data used for operating a gas turbine engine, as described herein. The data 610 can include one or more table(s), function(s), algorithm(s), model(s), equation(s), etc. for operating a gas turbine engine according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a gas turbine engine, the gas turbine engine comprising at least a high pressure spool and a low pressure spool, the method comprising:
   causing, by one or more control devices, electrical power to be drawn from a first electric machine associated with the high pressure spool and a second electric machine associated with the low pressure spool into a power distribution system, the first electric machine being in communication with the power distribution system via a first main line and the second electric machine being in communication with the power distribution system via a second main line, wherein a connecting line connects the first main line and the second main line, a core assist contactor being positioned along the connecting line; and
   initiating, by the one or more control devices in response to a power adjustment event associated with the high pressure spool, a power assist operation to redirect electrical power to the first electric machine associated with the high pressure spool based at least in part on the power adjustment event, wherein the initiating comprises causing, by the one or more control devices, the core assist contactor to switch closed such that electrical power generated by the second electric machine associated with the low pressure spool flows from the second main line to the first main line and to the first electric machine associated with the high pressure spool, and
   wherein a first main line contactor is positioned along the first main line between the first electric machine and the power distribution system and a first power converter is positioned between the first electric machine and the first main line contactor along the first main line, and wherein a first connecting line connects to the first main line between the first power converter and the first main line contactor, and
   wherein a second main line contactor is positioned along the second main line between the second electric machine and the power distribution system and a second power converter is positioned between the second electric machine and the second main line contactor along the second main line, and wherein the first connecting line connects to the second main line between the second power converter and the second main line contactor.

2. The method of claim 1, wherein initiating the power assist operation to redirect electrical power to the first electric machine associated with the high pressure spool based at least in part on the power adjustment event further comprises:
   causing, by the one or more control devices, electrical power to no longer be drawn from the first electric machine associated with the high pressure spool.

3. The method of claim 1, wherein the power assist operation comprises using an overload capability of at least one of the first electric machine and the second electric machine.

4. The method of claim 1, further comprising terminating, by the one or more control devices, the power assist operation when the power adjustment event terminates.

5. The method of claim 4, wherein terminating the power assist operation further comprises:
   causing, by the one or more control devices, electrical power drawn from the second electric machine associated with the low pressure spool to no longer be redirected to the first electric machine associated with the high pressure spool; and
   causing, by the one or more control devices, electrical power to resume being drawn from the first electric machine associated with the high pressure spool.

6. The method of claim 4, wherein initiating the power assist operation to redirect electrical power to the first electric machine associated with the high pressure spool based at least in part on the power adjustment event further comprises causing, by the one or more control devices, electrical power drawn from a battery to be redirected to the first electric machine associated with the high pressure spool.

7. The method of claim 6, wherein terminating the power assist operation further comprises causing, by the one or more control devices, electrical power drawn from the battery to no longer be redirected to the first electric machine associated with the high pressure spool.

8. The method of claim 6, wherein initiating the power assist operation to redirect electrical power to the first electric machine associated with the high pressure spool based at least in part on the power adjustment event further comprises causing, by the one or more control devices, electrical power drawn from an auxiliary power unit to be redirected to the first electric machine associated with the high pressure spool.

9. The method of claim 8, wherein terminating the power assist operation further comprises causing, by the one or more control devices, electrical power drawn from the auxiliary power unit to no longer be redirected to the first electric machine associated with the high pressure spool.

10. The method of claim 1, wherein the initiating further comprises directing supplemental electrical power from one or more of a generator associated with an auxiliary power unit and a battery to the first electric machine associated with the high pressure spool.

11. The method of claim 1, wherein causing, by the one or more control devices, electrical power drawn from the second electric machine associated with the low pressure spool to be redirected to the first electric machine associated with the high pressure spool further comprises:
   causing, by the one or more control devices, the first main line contactor to switch open to prevent electrical power from being directed from the first power converter to the power distribution system along the first main line.

12. The method of claim 11, wherein causing, by the one or more control devices, electrical power drawn from the second electric machine associated with the low pressure spool to be redirected to the first electric machine associated with the high pressure spool further comprises:
   causing, by the one or more control devices, a bus tie contactor to switch closed to permit electrical power to flow from the second main line to the first main line, the bus tie contactor being positioned along a second connecting line that connects the first main line and the second main line, wherein the second connecting line is connected to the first main line between the first main line contactor and the power distribution system and is connected to the second main line between the second main line contactor and the power distribution system.

13. The method of claim 12, further comprising:
   terminating, by the one or more control devices, the power assist operation when the power adjustment event terminates, wherein terminating the power assist operation comprises:

i) causing, by the one or more control devices, the core assist contactor to switch open to prevent electrical power from flowing from the second main line to the first main line;

ii) causing, by the one or more control devices, the first main line contactor to switch closed to permit electrical power to flow from the first power converter to the power distribution system; and iii) causing, by the one or more control devices, the bus tie contactor to switch open to prevent electrical power from flowing from the second main line to the first main line.

14. The method of claim 1, wherein initiating the power assist operation to redirect electrical power to the first electric machine associated with the high pressure spool based at least in part on the power adjustment event further comprises:

causing, by the one or more control devices, a second bus tie contactor to switch closed such that electrical power drawn from an electric machine associated with an auxiliary power unit is redirected to the first electric machine associated with the high pressure spool, wherein the electric machine associated with the auxiliary power unit is in communication with the power distribution system via a third main line, wherein a third connecting line connects the third main line and the first main line, the second bus tie contactor being positioned along the third connecting line.

15. The method of claim 14, wherein:
the third connecting line connects to the first main line between the first main line contactor and the power distribution system.

16. The method of claim 1, wherein initiating the power assist operation to redirect electrical power to the first electric machine associated with the high pressure spool based at least in part on the power adjustment event further comprises:

causing, by the one or more control devices, a third bus tie contactor to switch closed such that electrical power drawn from an energy storage device is redirected to the first electric machine associated with the high pressure spool, wherein the energy storage device is in communication with the power distribution system via a fourth main line, wherein a fourth connecting line connects the fourth main line and the first main line, the third bus tie contactor being positioned along the fourth connecting line.

17. The method of claim 16, wherein:
the fourth connecting line connects to the first main line between the first main line contactor and the power distribution system.

18. The method of claim 16, further comprising: terminating, by the one or more control devices, the power assist operation when the power adjustment event terminates, wherein terminating the power assist operation comprises:

i) causing, by the one or more control devices, the core assist contactor to switch open to prevent electrical power from flowing from the second main line to the first main line;

ii) causing, by the one or more control devices, the first main line contactor to switch closed to permit electrical power to flow from the first power converter to the power distribution system; and iii) causing, by the one or more control devices, the third bus tie contactor to switch open to prevent electrical power from flowing from the energy storage device to the first main line and to the electric machine associated with the high pressure spool.

19. A method for operating a gas turbine engine, the gas turbine engine comprising at least a high pressure spool and a low pressure spool, the method comprising:

causing, by one or more control devices, electrical power to be drawn from a first electric machine associated with the high pressure spool and a second electric machine associated with the low pressure spool into a power distribution system, the first electric machine being in communication with the power distribution system via a first main line and the second electric machine being in communication with the power distribution system via a second main line, wherein a connecting line connects the first main line and the second main line, a core assist contactor being positioned along the connecting line; and initiating, by the one or more control devices in response to a power adjustment event associated with the high pressure spool, a power assist operation to redirect electrical power to the first electric machine associated with the high pressure spool based at least in part on the power adjustment event, wherein the initiating comprises causing, by the one or more control devices, the core assist contactor to switch closed such that electrical power generated by the second electric machine associated with the low pressure spool flows from the second main line to the first main line and to the first electric machine associated with the high pressure spool, wherein initiating the power assist operation to redirect electrical power to the first electric machine associated with the high pressure spool based at least in part on the power adjustment event further comprises causing, by the one or more control devices, a second bus tie contactor to switch closed such that electrical power drawn from an electric machine associated with an auxiliary power unit is redirected to the first electric machine associated with the high pressure spool, wherein the electric machine associated with the auxiliary power unit is in communication with the power distribution system via a third main line, wherein a third connecting line connects the third main line and the first main line, the second bus tie contactor being positioned along the third connecting line, and wherein a first main line contactor is positioned along the first main line between the first electric machine and the power distribution system and a first power converter is positioned between the first electric machine and the first main line contactor along the first main line, and wherein the third connecting line connects to the first main line between the first main line contactor and the power distribution system.

20. A method for operating a gas turbine engine, the gas turbine engine comprising at least a high pressure spool and a low pressure spool, the method comprising:

causing, by one or more control devices, electrical power to be drawn from a first electric machine associated with the high pressure spool and a second electric machine associated with the low pressure spool into a power distribution system, the first electric machine being in communication with the power distribution system via a first main line and the second electric machine being in communication with the power distribution system via a second main line, wherein a connecting line connects the first main line and the second main line, a core assist contactor being positioned along the connecting line; and initiating, by the one or more control devices in response to a power adjustment event associated with the high pressure spool, a power assist operation to redirect electrical power to the first electric machine associated with the high pressure spool based at least in part on the power adjustment event, wherein the initiating comprises causing, by the one or more control devices, the core assist contactor to switch closed such that electrical power generated by the second electric machine associated with the low pressure spool flows from the second main line to the first main line and to the first electric machine associated with the high pressure spool, wherein initiating the power assist operation to redirect electrical power to the first electric machine associated with the high pressure spool based at least in part on the power adjustment event further comprises causing, by the one or more control devices, a third bus tie contactor to switch closed such that electrical power drawn from an energy storage device is redirected to the first electric machine associated with the high pressure spool, wherein the energy storage device is in communication with the power distribution system via a fourth main line, wherein a fourth connecting line connects the fourth main line and the first main line, the third bus tie contactor being positioned along the fourth connecting line, and wherein a first main line contactor is positioned along the first main line between the first electric machine and the power distribution system and a first power converter is positioned between the first electric machine and the first main line contactor along the first main line, and wherein the fourth connecting line connects to the first main line between the first main line contactor and the power distribution system.

* * * * *